(No Model.)
S. STUART.
SHAFT COUPLING.
No. 316,919. Patented Apr. 28, 1885.
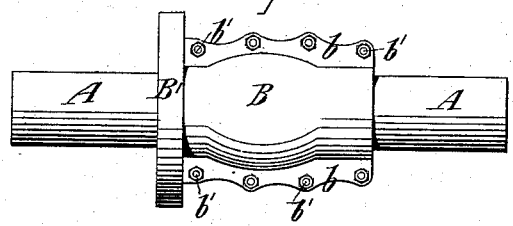
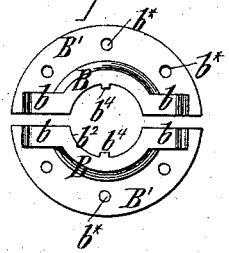
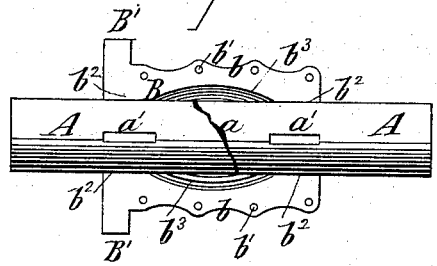
WITNESSES.
Matthew Pollock
INVENTOR.
Sinclair Stuart
by his Attys
Brown & Hall

UNITED STATES PATENT OFFICE.

SINCLAIR STUART, OF PLAINFIELD, NEW JERSEY.

SHAFT-COUPLING.

SPECIFICATION forming part of Letters Patent No. 316,919, dated April 28, 1885.

Application filed February 24, 1885. (No model.)

*To all whom it may concern:*

Be it known that I, SINCLAIR STUART, of Plainfield, in the county of Union and State of New Jersey, have invented a new and useful Improvement in Shaft-Couplings, of which the following is a specification.

My invention relates to shaft-couplings which are composed of two halves or longitudinal sections provided with bolts connecting them, and which are particularly intended for use in connecting broken propeller-shafts of steamers, but which may also be used for connecting other shafts when broken. Clamping-couplings of that class are shown and described in my United States Letters Patent No. 155,121, granted September 15, 1874, and No. 157,427, granted December 1, 1874.

The object of this invention is to provide a coupling which, in case of a fracture close to one of the flanged couplings or the thrust-bearing of the shaft, may be secured thereon as a substitute for one part of the ordinary flanged coupling, or which may serve as a thrust-collar in case the break is close to the thrust-bearing.

The invention consists in a novel construction of the two-part coupling, as particularly hereinafter described, and pointed out in the claim.

In the accompanying drawings, Figure 1 is an outside view of two portions of a shaft and a coupling uniting them and embodying my invention. Fig. 2 is an end view of the two-part coupling; and Fig. 3 is a side view representing the shaft at the point of fracture, and a face view of one part of the coupling applied thereto.

Similar letters of reference designate corresponding parts in all the figures.

A A designate the two portions of a shaft which has become fractured at $a$, and B B designate the two parts of the clamping-coupling, which are provided with flanges $b$, and with bolts $b'$, passing through these flanges, and serving to clamp the parts of the coupling tightly upon the shaft. This coupling has a cylindric bore, $b^2$, at each end only, and between the ends, for a considerable portion of the length of the coupling, is chambered out or constructed with an internal cavity, $b^3$, so that when the coupling is clamped upon the shaft it will have a bearing thereon at isolated points only, which are at a considerable distance from the fracture.

The parts B of the coupling are each provided with inwardly-projecting tongues or lugs $b^4$, and when a coupling is to be applied to a shaft the latter is grooved or channeled, as represented at $a'$, to receive these lugs or tongues $b^4$, and thereby the parts of the coupling will be securely locked to the two parts of the fractured shaft.

In lieu of providing lugs or tongues $b^4$ on the parts of the coupling, they may be destitute of any such lugs or tongues, and after the coupling is clamped upon the shaft holes may be drilled thereinto, and radial pins inserted through the coupling and into the shaft, as is shown in my Letters Patent No. 157,427, above referred to.

The coupling has at one end a flange, B', in which are holes $b^*$. The construction of the coupling with this flange B' enables it to be employed in cases where the break in the shaft is close to a flanged coupling of the ordinary kind. In such cases one half of the ordinary flanged coupling is knocked off, and my improved coupling, being secured in place thereon, may be bolted securely to the other half of the flanged coupling by bolts inserted through the holes $b^*$ in the flange B'. The construction of the coupling with this flange B' also enables it to serve the purpose of a thrust-collar on the shaft when the break thereon is close to the thrust-bearing.

What I claim as my invention, and desire to secure by Letters Patent, is—

A two-part coupling for a fractured shaft, provided at the ends with cylindric bores or portions to be locked to the two parts of the shaft, and having a long internal cavity or chamber, $b^3$, between the ends, and the flange B' at one end, substantially as and for the purpose herein described.

SINCLAIR STUART.

Witnesses:
 FREDK. HAYNES,
 MATTHEW POLLOCK.